June 6, 1961        F. G. MULLER        2,987,072
BUTTERFLY VALVE AND SEALING MEANS THEREFOR
Filed Feb. 21, 1957        2 Sheets-Sheet 1
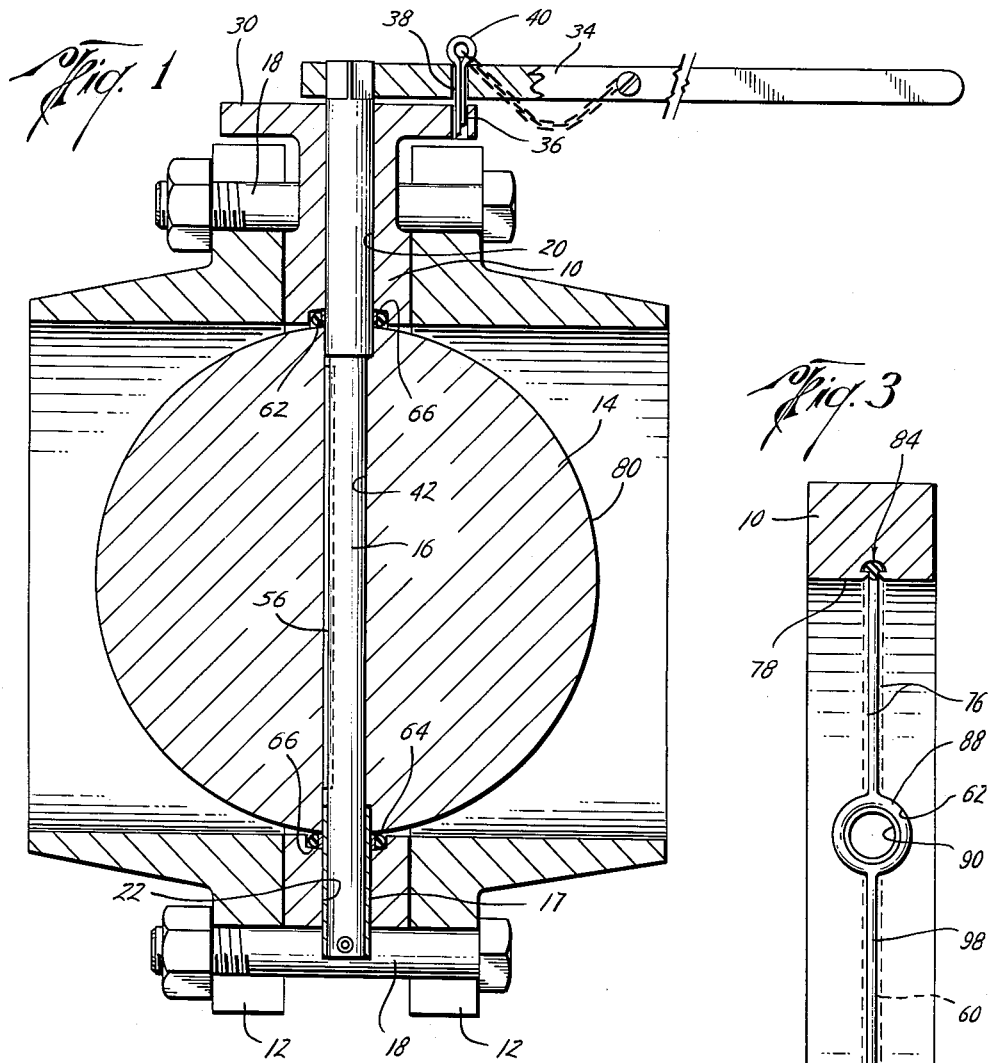
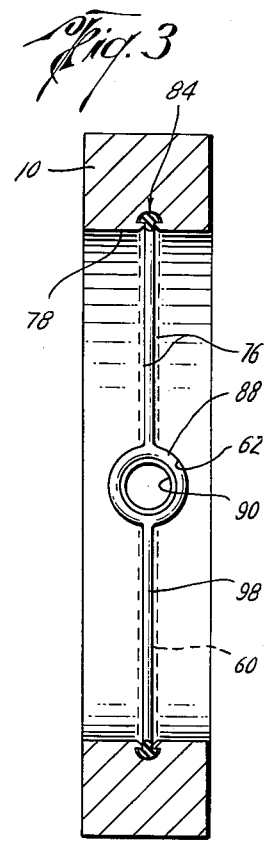
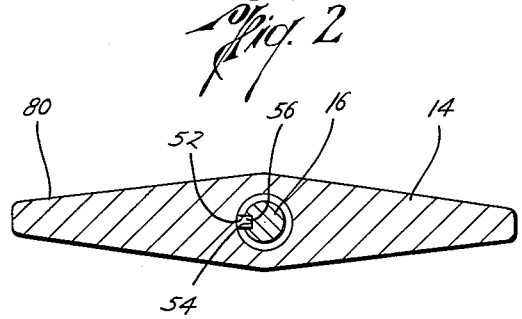
Frank G. Muller
INVENTOR.
BY Charles E. Lightfoot
ATTORNEY

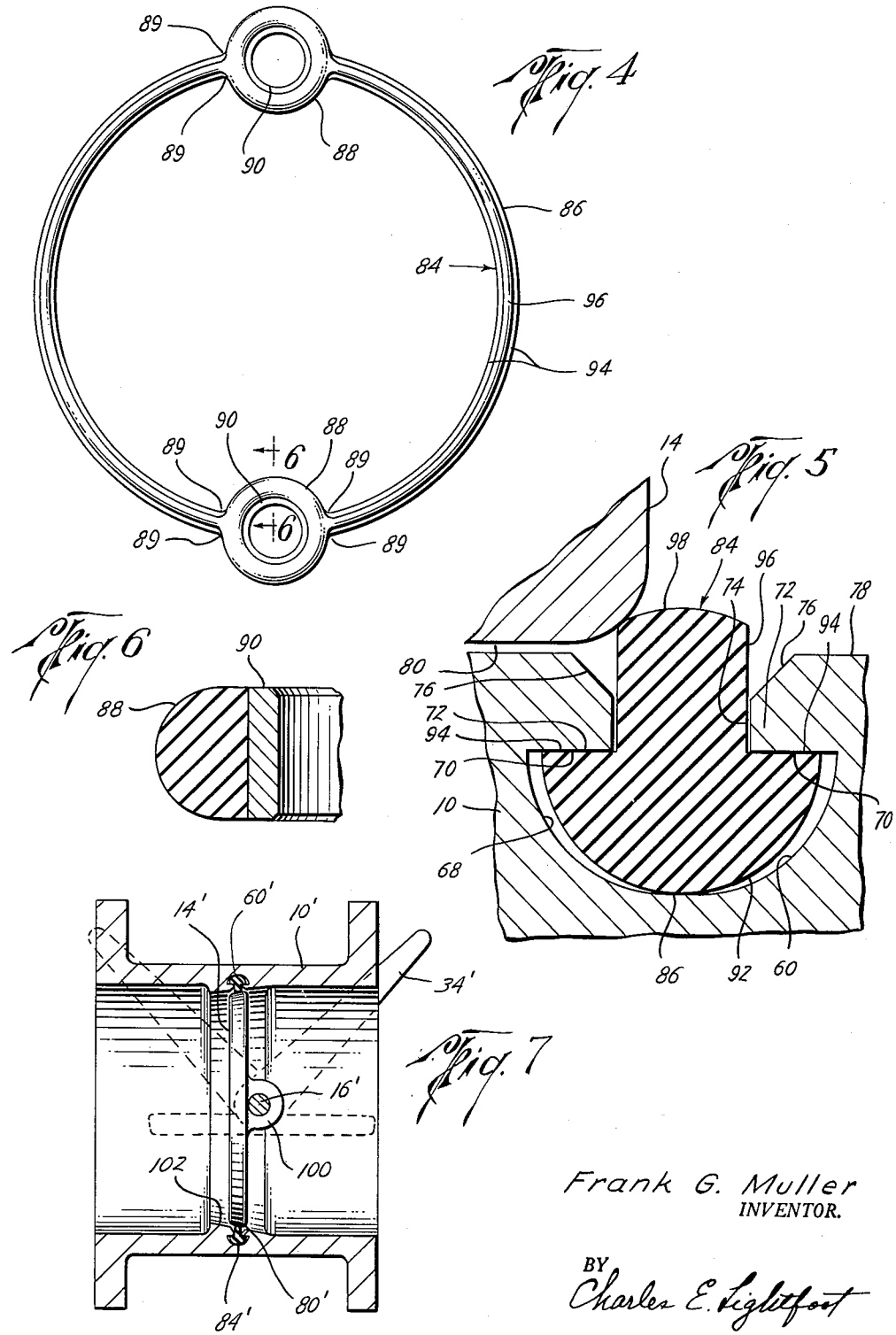

United States Patent Office 2,987,072
Patented June 6, 1961

2,987,072
BUTTERFLY VALVE AND SEALING MEANS THEREFOR
Frank G. Muller, Houston, Tex.
(P.O. Box 967, La Porte, Tex.)
Filed Feb. 21, 1957, Ser. No. 641,651
5 Claims. (Cl. 137—306)

This invention relates to a butterfly valve and sealing means therefor.

The invention has for an important object the provision of a valve of the butterfly type having a valve casing and a valve disk which is mounted on a rotatable shaft extending into the casing, and including an internal groove formed in the casing in position to receive a seal forming element to form a fluid tight seal between the valve and casing when the valve is in closed position, and also forming a seal between the shaft and casing in all positions of the valve.

Another object of the invention is the provision in a butterfly valve having a casing and a valve disk rotatably mounted therein of improved seal forming means including an internal groove in the casing and a seal forming element positioned in the groove, the groove and element being shaped to coact to hold the element against displacement from the groove under the influence of the pressure of fluid flowing through the valve.

A further object of the invention is to provide a seal forming element for a butterfly valve of the type having a valve casing and a valve disk mounted on a rotatable shaft extending into the casing which element includes a portion surrounding said shaft to form a seal between the shaft and casing in all positions of the valve and having means for preventing excessive wear on the element due to repeated opening and closing movements of the valve.

Another object of the invention is to provide a butterfly valve having a casing and valve disk construction designed to permit 360° movement of the valve disk whereby the valve may be opened or closed by rotation of the disk in either direction.

A further object of the invention is the provision of a valve of the butterfly type which is constructed for high pressure use, and which is reversible to permit the same to be applied to a flow line without regard to the direction of the flow of fluid therethrough.

Another object of the invention is to provide a butterfly valve assembly of simple design and rugged construction, having few parts, and which may be easily and quickly assembled and disassembled for purposes of repair and replacement.

The above and other important objects and advantages of the invention may best be understood from the following detailed description, constituting a specification of the same, when considered in conjunction with the annexed drawings, wherein—

FIGURE 1 is a longitudinal, central, cross-sectional view of a preferred embodiment of the invention showing details of construction of the same with the parts in assembled condition;

FIGURE 2 is an end view of the valve disk of the butterfly valve removed from the assembly;

FIGURE 3 is a transverse, central, cross-sectional view of the valve casing, taken at right angles to the view of FIGURE 1, with the valve disk removed therefrom;

FIGURE 4 is a detailed view of the improved sealing element of the butterfly valve removed from the assembly;

FIGURE 5 is a fragmentary, cross-sectional view, on a greatly enlarged scale, similar to that of FIGURE 3, but with the valve disk mounted in the assembly, showing details of structure of the valve casing, seal forming element and valve disk, and illustrating the relationship of those parts in the operation of the valve;

FIGURE 6 is a cross-sectional view taken along the line 6—6 of Figure 4, looking in the direction indicated by the arrows, and on a greatly enlarged scale; and, FIGURE 7 is a cross-sectional view similar to that of FIGURE 1, on a reduced scale, illustrating a modification of the invention.

Referring now to the drawings in greater detail, the invention, briefly stated, comprises a valve casing or housing, generally designated 10, of generally annular configuration, which is adapted to be clamped between end flanges 12, 12 of conventional construction such as those used in connecting together lengths of pipe to form a flow line and within which housing a valve disk 14 is keyed to a shaft 16, whose opposite ends are rotatably supported, so that the disk may be rotated with the shaft to opened or closed position.

The end flanges 12, 12 are secured together in clamping relation to the housing in any convenient manner, as by means of bolts 18.

The housing 10 is provided with diametrically opposite openings 20 and 22, through which the shaft 16 extends, and the housing being provided with an external flange 30 through which one end of the shaft extends. The shaft 16 is extended outwardly beyond the external flange 30 and is connected at its outer end to an operating lever 34 whereby the shaft may be rotated. Suitable means, such as one or more openings 36 in the flange 30 may be provided, which are positioned for registration with the opening 38 in the lever 34 to permit the insertion of a pin 40, whereby the valve disk may be held in any desired position in the housing.

The valve disk 14 has a centrally located diametrical bore 42, through which the shaft 16 extends, and within the bore 42 a longitudinal internal keyway 52 is provided, the shaft 16 having a similar external keyway 54, into which keyway a key 56 is fitted, to cause the disk to rotate with the shaft.

The assembly is described as one of many forms whereby the valve disk 14 may be secured to the shaft.

The housing 10 has an internal groove 60 extending circumferentially between the openings 20 and 22 of the housing, and provided with annular internal recessed portions 62 and 64, surrounding the openings 20 and 22, respectively, these annular recessed portions having bottom walls 66 which are spherical in shape. The groove 60 is of generally inverted T shape, as illustrated in FIGURE 5, having a curved bottom wall 68, terminating in inwardly extending wall portions 70, formed by shoulders 72 on each side of the groove, which shoulders define a central slot 74, through which the groove opens into the interior of the housing. The walls of the slot 74 are flared outwardly at their inner portions 76. The housing 10 is also formed with an inner cylindrical face 78 through which the slot 74 opens. The disk 14 is formed with an external circumferential spherical surface 80, which is positioned to lie in opposed relation to the spherical bottom walls 66 of the recesses 62 and 64, and the groove 60, when the valve is in closed position. In all positions of the valve the spherical surface of the valve and the spherical bottom surfaces of the recesses 62 and 64 are positioned in concentric relation.

Within the groove 60 and the recesses 62 and 64 of the housing a seal forming element 84 is disposed, which is of generally T-shape in cross-section, and formed of three ring-shaped portions joined together, made of resilient material, such as rubber, or the like, having circumferentially extending portions 86 adapted to be positioned in the groove 60, and annular portions 88 connecting the portions 86 and which are arranged to be positioned in the annular recesses 62 and 64 of the housing. The ring shaped portions 88 are provided with annular inserts 90, formed of brass, bronze, or the like, surrounding the shaft 16, and of a length equal to that of the ring portions 88, these inserts having an internal diameter which is greater than the external diameter of the shaft and also the external diameter of the bushing 17 surrounding the shaft, positioned for engagement with the bottom walls of the recesses and the spherical face 80 of the disk, to prevent flattening and wear on the ring portions 88 due to opening and closing movements of the disk.

The portions 86 of the seal forming element, which are of generally inverted T-shape in cross-section are formed with a head, whose maximum width is less than the maximum width of the groove 60 in the vicinity of the shoulders 72, whose maximum height is somewhat greater than the maximum depth of the groove from the shoulders 72 to the curved bottom wall 68, and having faces 94 positioned for engagement with the walls 70 of the groove, when the seal forming element is inserted in the groove. The seal forming element also has a shank portion 96 of the T, which extends through the slot 74, and is provided with a curved face 98, located in the housing, inwardly beyond the slot, in position for sealing engagement with the spherical face 80 of the valve disk, when the valve is closed.

The head of the T of the seal forming element, is thus somewhat similar in cross-section shape to the cross-sectional shape of the groove, so that the seal forming element may be readily inserted into the groove, by pressing the head through the slot 74, and when inserted in the groove, the faces 94 of the element will be in sealing engagement with the wall portions 70 of the groove, securely to hold the seal forming element against displacement from the groove, due to the pressure of fluid flowing through the valve, which may enter the groove from the downstream side of the valve disk. Thus the seal forming element is prevented from being dislodged or extruded from the groove by the pressure of fluid, particularly upon opening and closing movements of the valve, and the sealing contact of the faces 94 with the wall portions 70 prevents the entrance of pressure from the flowway into the groove.

The ring portions 88 are turned 90° from the position shown in FIGURE 4 when the sealing element is inserted in the groove and recesses of the housing. By this construction the element is maintained in sealing contact with the spherical face of the valve disk and with the bottom walls of the recesses 62 and 64 surrounding the shaft 16, so that the seal forming element is at all times forming a seal between the disk and housing about the shaft, to prevent leakage in all positions of the valve. The seal forming element has fillets such as those shown at 89 where the ring portion 84 joins the ring 88, to form seals to prevent the entrance of pressure in the flowway around the rings 88 from entering the groove 60.

In FIGURE 7 there is illustrated a somewhat modified form of the invention, wherein the valve disk 14′ has a perforated lug 100 extending from one face of the disk, through which the shaft 16′ extends, and the housing 10′ is formed with an internal annular tapering face 102, opposite which the circumferential face 80′ of the valve disk lies when the valve is in closed position. The housing 10′ is provided with an internal annular groove similar to the groove 68, but which is continuous, and without the recesses surrounding the shaft, and in which a continuous ring 84′ is inserted, whose cross-section is similar to the cross-section of the ring portions 86, previously described.

In other respects this form of the invention is constructed and operated substantially in the manner previously described in connection with the form of the invention illustrated in FIGURE 1.

In the operation of the invention the valve disk 14 may be rotated 360° by means of the handle 34, and may thus be opened or closed by rotation in either direction in the housing. When the valve is moved to its closed position, the external peripheral spherical surface of the disk engages the seal forming element 84, which projects somewhat inwardly from the slot 74, to form a fluid tight seal between the disk and housing, the seal forming element being forced inwardly of the groove during closing movement of the valve. It will also be apparent that the portions 88 of the seal forming element are at all times compressed between the spherical surface of the disk and the spherical bottom surfaces of the recesses 62 and 64, whereby a fluid tight seal is maintained about the shaft of the valve in all positions of the valve.

It will thus be seen that the invention, constructed and operated as described above, provides a valve of the butterfly type, wherein the flowway is substantially unobstructed when the valve is in open position, in which the valve is sealed against the flow of fluid therethrough in either direction when the valve is closed, and also in which a constant seal is maintained between the valve disk and the housing about the valve shaft.

The invention has been disclosed herein in connection with certain specific embodiments of the same, but it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is—

1. In a butterfly valve assembly the combination with a casing having a cylindrical flowway, a valve in the flowway, means for supporting the valve on the casing for rotation to one position to close the flowway and to another position to open the flowway, said valve having a peripheral surface of spherical shape, said casing having an internal groove positioned in concentric relation to said spherical surface and whose bottom wall is curved in the direction of the axis of the flowway, said casing having portions extending inwardly from the sides of the groove and forming annular shoulders having faces spaced radially inwardly from and facing the bottom of the groove, of seal forming means in the groove and extending radially inwardly beyond the groove in position for sealing engagement with the valve when the valve is closed, said seal forming means having a rounded surface positioned in contact with said bottom wall and wall portions spaced radially inwardly from said rounded surface positioned for coaction with said faces to hold the seal forming means in the groove the cross-sectional area of said groove being greater than the cross-sectional area of the seal forming means in the groove, and the maximum width of the seal forming means being less than the maximum width of the groove to provide space in the groove into which the seal forming means may expand when the valve is closed.

2. In a butterfly valve assembly the combination with a casing having a cylindrical flowway, a valve in the flowway, means for supporting the valve on the casing for rotation to one position to close the flowway and to another position to open the flowway, said valve having a peripheral surface of spherical shape, said casing having an internal annular groove of T-shape in cross-section positioned in concentric relation to said spherical surface, of a seal forming element shaped to fit within said groove and extending radially inwardly beyond the groove in position for engagement with said spherical surface to form a seal between the valve and casing when the valve is closed, said element having laterally extending portions positioned for engagement with the casing in the groove to hold the element in the groove the cross-sectional area of said groove being greater than the cross-sectional area of the seal forming element in the groove and the maximum width of the element being less than the maximum width of the groove to provide space in the groove into which the seal forming element may expand when the valve is closed.

3. In a butterfly valve assembly the combination with a casing having a cylindrical flowway, and diametrically oppositely disposed shaft bearings, a valve in the flowway, shaft means mounted for rotation in said bearings and upon which the valve is supported for rotation with the shaft means to one position to close the flowway and to another position to open the flowway, said valve having a peripheral surface of spherical shape, said casing having an internal groove provided with annular portions surrounding the shaft means whose bottom walls are spherical and disposed in concentric relation to said spherical surface and portions of T-shape in cross-section extending between said annular portions, of seal forming means in said groove and including portions positioned in said annular portions shaped to engage said spherical surface and said bottom walls to form a seal between the valve and casing about said shaft means in all positions of the valve and portions of T-shape in cross-section positioned in the T-shaped portions of the groove in sealing engagement with the casing and extending radially inwardly therefrom for engagement with said spherical surface to form a seal between the casing and valve when the valve is closed, the maximum width of said seal forming means being less than the maximum width of said groove to provide space in the groove into which the seal forming means may expand when the valve is closed.

4. In a butterfly valve assembly the combination with a casing having a cylindrical flowway, and diametrically oppositely disposed shaft bearings, a valve in the flowway, shaft means mounted for rotation in said bearings and upon which the valve is supported for rotation with the shaft means to one position to close the flowway and to another position to open the flowway, said valve having a peripheral surface of spherical shape, said casing having an internal groove provided with annular portions surrounding the shaft means whose bottom walls are spherical and disposed in concentric relation to said spherical surface and portions of T-shape in cross-section extending between said annular portions whose bottom walls are curved in the direction of the axis of the flowway, of seal forming means in said groove and including portions positioned in said annular portions shaped to engage said spherical surface and the bottom walls of said annular portions to form a seal between the valve and casing about said shaft means in all positions of the valve and portions of T-shape in cross-section positioned in the T-shaped portions of the groove in sealing engagement with the casing and extending radially inwardly therefrom for engagement with said spherical surface to form a seal between the casing and valve when the valve is closed, the cross-sectional area of said T-shaped portions of said groove being greater than the cross-sectional area of said T-shaped portions of said seal forming means in the groove and said seal forming means having side portions spaced inwardly from the side walls of said T-shaped portions of the groove to provide space in the groove into which said seal forming means may expand when the valve is closed.

5. In a butterfly valve assembly the combination with a casing having a cylindrical flowway, a valve in the flowway, means for supporting the valve on the casing for rotation to one position to close the flowway and to another position to open the flowway, said valve having an annular peripheral surface, said casing having an internal annular groove of T shape in cross-section positioned in concentric relation to said peripheral surface and whose bottom wall is spherical, of a seal forming element of T shape in cross-section positioned in the groove and extending radially inwardly beyond the groove in position for engagement with said peripheral surface to form a seal between the valve and casing when the valve is closed, side portions of said element in the groove radially inwardly of said bottom wall being spaced inwardly from the side walls of the groove to provide space in the groove into which the element may expand when the valve is closed.

References Cited in the file of this patent

UNITED STATES PATENTS

| | | |
|---|---|---|
| 1,824,168 | Orton | Sept. 22, 1931 |
| 1,977,351 | Phillips | Oct. 16, 1934 |
| 2,054,369 | Francis | Sept. 15, 1936 |
| 2,081,842 | Sharp | May 25, 1937 |
| 2,385,510 | Harwood | Sept. 25, 1945 |
| 2,487,659 | Lockheed | Nov. 8, 1949 |
| 2,499,952 | Harbison | Mar. 7, 1950 |
| 2,809,060 | Thompson | Oct. 8, 1957 |
| 2,841,429 | McCuistion | July 1, 1958 |
| 2,847,181 | Muller | Aug. 12, 1958 |